United States Patent Office 3,090,791
Patented May 21, 1963

3,090,791
SYNTHESIS OF GRISEOFULVIN AND ANALOGUES, AND INTERMEDIATES THEREFOR
Arnold Brossi and Emilio Kyburz, Riehen, Switzerland, assignors to Hoffmann-La Roche Inc., Nutley, N.J., a corporation of New Jersey
No Drawing. Filed July 18, 1961, Ser. No. 124,780
Claims priority, application Switzerland July 25, 1960
9 Claims. (Cl. 260—346.2)

The present invention concerns new processes for the production of spirocyclic compounds of the formula (I) 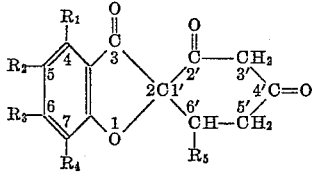

wherein $R_1$, $R_2$, $R_3$ and $R_4$ are selected from the group consisting of hydrogen, lower alkyl, halo-lower alkyl, lower alkoxy, nitro, hydroxy and halogen, and $R_5$ is lower alkyl, and their enol ethers.

Compounds obtainable by the processes of the invention are useful as medicinal agents, or as intermediates for the preparation of such agents. Some representatives of this class of compounds have a marked systemic effect against fungi, especially fungi pathogenic to humans, such as *Trichophyton mentagrophytes*, *Trichophyton rubrum* or *Microsporum audouini*. The compounds can be administered internally in conventional pharmaceutical forms such as for example capsules, suppositories, tablets, and the like, with dosage adjusted to individual requirements.

The invention also comprehends certain novel intermediates for the compounds of Formula I above and these will be set forth in more detail hereafter.

The processes of the invention comprise cyclizing a compound selected from the group consisting of compounds of the formula (II) 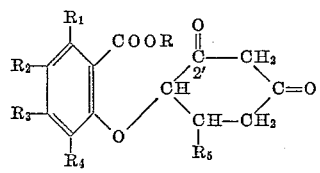

and their enol ethers, wherein R is selected from the group consisting of hydrogen and lower alkyl, and $R_1$, $R_2$, $R_3$, $R_4$ and $R_5$ have the same meaning as above.

Where R is hydrogen it is first converted to an ester prior to the actual cyclization step. The enol ether, if desired, can be formed either before or after the cyclization.

As used in this description, the term lower alkyl comprehends both straight and branched chain aliphatic hydrocarbon groups such as methyl, ethyl, propyl, isopropyl and the like. Similarly, the term alkoxy comprehends groups such as methoxy, ethoxy, n-propoxy, isopropoxy and the like. Of the various compounds comprehended by Formula I above, and correspondingly Formula II, especially preferred are those in which $R_1$, $R_2$, $R_3$ and $R_4$ are selected from the group consisting of hydrogen, lower alkoxy and halogen.

A 2'-enol-methyl ether of a carboxylic acid represented by Formula II above, wherein $R_1$ and $R_3$ each represent methoxy, R and $R_2$ each represent hydrogen, $R_4$ stands for chlorine and $R_5$ for methyl, is a preferred starting material which can e.g. be prepared from racemic epi-griseofulvin being an antimycotically inactive stereoisomeric 2'-enol-methyl ether of a correspondingly substituted compound represented by Formula I. The mode of preparation is as follows:

22.8 gms. of sodium are dissolved in 1050 ml. of methanol, 3.5 gms. of racemic epi-grieseofulvin are added thereto, and the resulting solution is heated for 3 hours at 80° C. on the water bath. It is then concentrated in a water-pump vacuum and the residue mixed with 2,000 mls. of water. 1.0 gm. of a mixture of racemic grieseofulvin and racemic epi-griseofulvin precipitates and is filtered off. Hydrochloric acid is added to the filtrate until it tests acid with Congo red and it is repeatedly extracted with ethyl acetate. After the usual working up of the extract there are obtained 1.8 gms. of 2-(2-methoxy-4-oxo-6-methyl-2-cyclohexenyloxy)-3-chloro-4,6-dimethoxy-benzoic acid, which after recrystallization from methanol melts at 212–214° C.; U.V. absorption maxima in ethanol at 250 m$\mu$ and 289 m$\mu$ (shoulder), $\epsilon$=18,500 and 3,900.

This substituted benozic acid, wherein the 2'-position keto group has undergone enolization and etherification, is exemplary of carboxylic acids of Formula II employed as starting materials. Such a compound can be converted into the free 2',4'-diketone by saponification, for example by means of alkalies.

Carboxylic acid esters of Formula II which can be employed as starting materials can be prepared synthetically, for example by the following method:

A 2-hydroxybenzoic acid methyl ester, which can be substituted, is condensed with bromomalonic acid dimethyl ester, then $\alpha,\beta$-unsaturated alkenyl methyl ketone is added to the reaction product, the addition product formed is cyclized under alkaline conditions, and the cyclization product is partially hydrolyzed and decarboxylated under acidic conditions.

This method of preparation is more specifically illustrated by the following reaction scheme for a preferred starting material:

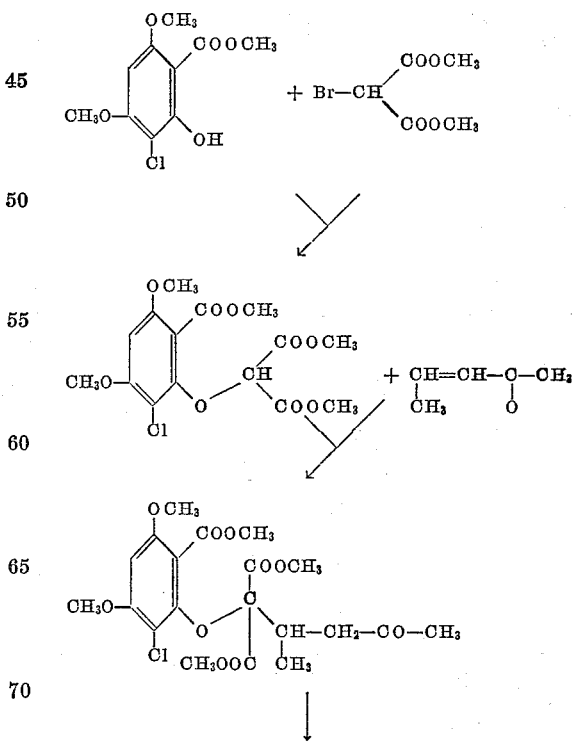

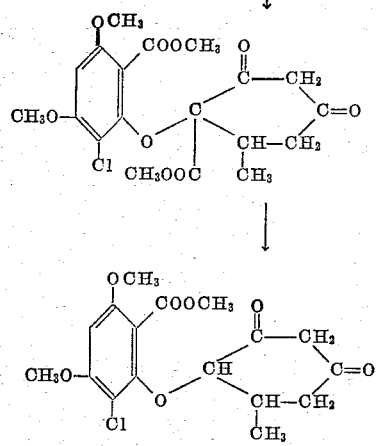

Carboxylic acid esters of Formula II can be directly subjected to cyclization according to the processes of the invention.

If the process is conducted using as starting materials esters of Formula II which have two free keto groups in the hydroaromatic ring, these can be converted into the corresponding mono-enol ethers either before or after the cyclization. Said conversion results in two position-isomeric reaction products, viz. the 2'-enol ether and the 4'-enol ether. These can be separated by known methods, for example by fractional crystallization or by chromatography on aluminum oxide.

The conversion of the β-diketone into the enol ether is appropriately effected by treatment of the former with a dialkyl sulfate, such as dimethyl sulfate, in the presence of an alkaline material, for example potassium carbonate. The conversion into the enol ether can, however, also be accomplished by treatment with diazomethane, or by treatment with alcohols in the presence of hydrochloric acid.

According to one especially preferred embodiment of the invention, a 2'-enol ether of the carboxylic acid of Formula II is esterified and then cyclized. As the esterification agent, diazomethane can usefully be employed and the reaction can be conducted in a solvent, such as, for example in an alcohol, especially methanol, or dioxane, or the like. Advantageously this reaction is conducted at about room temperature. The esterification can also be accomplished by reacting an enol ether of the carboxylic acid of Formula II with a lower aliphatic alcohol such as methanol, ethanol, propanol, or the like, suitably in the presence of a carbodiimide. Aromatic, aliphatic and cyclo-aliphatic representatives of the latter class of compounds can be employed, e.g. p-ditolylcarbodiimide, di-tertbutylcarbodiimide, di-cyclohexylcarbodiimide and the like. Especially preferred is the use of di-cyclohexylcarbodiimide.

In a further step of the reaction, the so obtained ester of the enol ether of the carboxylic acid of Formula II is cyclized. One appropriate embodiment comprises effecting the ring closure by the action of an alkaline condensation agent in a suitable solvent, such as, for example, methanol, benzene, dioxane, or the like. The reaction can be conducted at room temperature but it is preferable to conduct it at somewhat elevated temperatures. The alkaline condensation agent can be an alkali metal, for example potassium, lithium or sodium. Likewise, alkali alcoholates, for example alkali metal alcoholates such as sodium alcoholates for example sodium methylate, can be employed. Also alkali metal hydrides, for example sodium hydride, represent suitable alkaline condensation agents.

Compounds of Formula I, which possess keto groups in the 2' and 4' position, are acidic compounds which can be liberated from aqueous solutions of their alkali salts by the addition of acids, such as acetic acid, hydrochloric acid, or the like. They can, if desired, be converted into the corresponding enol ethers by treatment with alkylating agents such as diazomethane, dialkyl sulfates, e.g. dimethyl sulfate, or p-toluene sulfonic acid alkyl esters, e.g. p-toluene sulfonic acid methyl ester, and the like.

Suitably, a 2'-enol-methyl ether of a carboxylic acid of Formula II is subjected to esterification and cyclization.

The end products of Formula I and their enol ethers occur in two stereoisomeric racemates. Both of the epimeric racemates can be obtained from the reaction mixture by separation by methods known per se, for example by chromatography on aluminum oxide. Epimerization of inactive isomers, e.g. by treatment with alkaline agents, yields a mixture of the two isomers, in addition to acids of Formula II or their enol ethers, respectively, employable as starting materials. Thus, since according to the methods of the invention these acids can again be converted into the spirocyclic compounds of Formula I, the yield of the active material can be considerably increased by the epimerization process. The processes of the invention thus make it possible to convert the undesired epimeric form into the stereoisomerically desired form in improved yields.

The following examples are illustrative, but not limitative of the invention. All temperatures are in degrees centigrade.

*Example 1*

1 gm. of 2-(2-methoxy-4-oxo-6-methyl-2-cyclohexenyloxy)-3-chloro-4,6-dimethoxy-benzoic acid was dissolved in 200 ml. of methanol and the resulting solution was mixed with an ether solution of diazomethane until the yellow color persisted. After standing for 2 hours, the solution was concentrated and the residue crystallized from methanol, yielding 1 gm. of 2-(2-methoxy-4-oxo-6-methyl-2-cyclohexenyloxy)-3-chloro-4,6-dimethoxy-benzoic acid methyl ester melting at 154–156°; U.V. maxima at 249 mμ and 286 mμ (shoulder), ε=24,700 and 3,730 (2,4-dinitrophenylhydrazone; melting point 178–180°).

*Example 2*

2 gms. of 2-(2-methoxy-4-oxo-6-methyl-2-cyclohexenyloxy)-3-chloro-4,6-dimethoxy-benzoic acid was dissolved in 300 ml. of methanol and mixed with 1.5 gms. of di-cyclohexylcarbodiimide. After standing one hour at room temperature the mixture was concentrated in vacuo and the residue was partitioned between ether and dilute sodium hydroxide. Precipitated di-cyclohexylurea was filtered off, the ether solution separated and then dried and concentrated. Crystallization of the residue from methanol yielded 1.5 gms. of 2-(2-methoxy-4-oxo-6-methyl - 2-cyclohexenyloxy)-3-chloro-4,6-dimethoxy-benzoic acid methyl ester of melting point 154–156°, which is identical with the product described in Example 1.

*Example 3*

1 gm. of 2-(2-methoxy-4-oxo-6-methyl-2-cyclohexenyloxy)-3-chloro-4,6-dimethoxy-benzoic acid methyl ester was added to a sodium methylate solution prepared from 6.3 gm. of sodium and 300 ml. of methanol, and was maintained for 3 hours at a bath temperature of 80°. Thereafter the solution was cooled to 0° and methanolic hydrochloric acid added thereto until a pH of 7.0 was reached. The reaction mixture was then concentrated in a vacuum and 100 ml. of water added to the residue. Thus, 780 mg. of a mixture of racemic griseofulvin and racemic epigriseofulvin which melts at 229–231° was obtained. U.V. maxima in alcohol at 236 mμ, 250 mμ (shoulder), 290 mμ and 323 mμ, ε=25,000, 17,000, 23,500 and 5,600. The separation into the isomers was effected by chromatography of 500 ml. of the mixture on a column of 75 gms. aluminum oxide (Activity II) with chloroform. The first 300 ml. of chloroform eluate contained 225 mg. of racemic epi-griseofulvin melting at 248–250°. The next 100 ml. of eluate contained 100 mg. of an isomeric mixture. With the last 200 ml., 175 mg. of racemic griseofulvin was obtained. It melted after crystallization from ethyl acetate/petroleum ether mixture at 214–216°, U.V. maxima in ethanol at 236 m$\mu$, 250 m$\mu$ (shoulder), 292 m$\mu$ and 325 m$\mu$, $\epsilon$=23,300, 16,600, 24,900 and 5,820.

We claim:

1. A method for the production of spirocyclic compounds which comprises cyclizing by treatment with a condensation agent selected from the group consisting of alkali metal, alkali lower alcoholate and alkali metal hydride, in the presence of an organic solvent selected from the group consisting of lower alkanol, benzene and dioxane a compound selected from the group consisting of compounds of the formula (II) 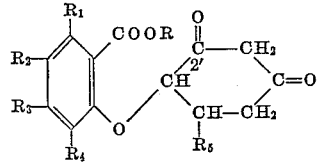

and their enol lower alkyl ethers,
wherein R is selected from the group consisting of hydrogen and lower alkyl, $R_1$, $R_2$, $R_3$, $R_4$ are selected from the group consisting of hydrogen, lower alkyl, halo-lower alkyl, lower alkoxy, nitro, hydroxy and halogen and $R_5$ represents lower alkyl.

2. A method according to claim 1 wherein the compound of Formula II is a 2′,4′-diketone and it is converted into its 2′-enol lower alkyl ether prior to cyclization.

3. A method according to claim 1 wherein the compound of Formula II is a 2′,4′-diketone and it is converted into its 2′-enol lower alkyl ether subsequent to cyclization.

4. A method according to claim 1 wherein a carboxylic acid of Formula II is esterified prior to cyclization.

5. A method according to claim 1 wherein a 2′-enol lower alkyl ether of a carboxylic acid of Formula II is reacted with diazomethane to effect esterification prior to cyclization.

6. A method according to claim 1 wherein a 2′-enol lower alkyl ether of a carboxylic acid of Formula II is reacted with a lower aliphatic alcohol to effect esterification prior to cyclization.

7. A method according to claim 1 wherein a 2′-enol-methyl-ether of a carboxylic acid of Formula II is esterified and then cyclized.

8. A compound of the formula

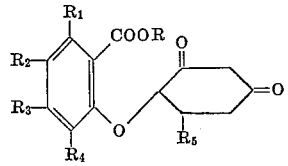

wherein R is selected from the group consisting of hydrogen and lower alkyl; $R_1$, $R_2$, $R_3$ and $R_4$ are selected from the group consisting of hydrogen, lower alkyl, halo-lower alkyl, lower alkoxy, nitro, hydroxy and halogen; and $R_5$ represents lower alkyl.

9. A compound of the formula

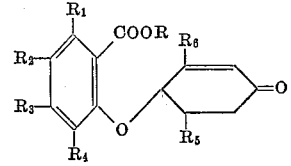

wherein R is selected from the group consisting of hydrogen and lower alkyl; $R_1$, $R_2$, $R_3$ and $R_4$ are selected from the group consisting of halo-lower alkyl, hydrogen, lower alkyl, lower alkoxy, nitro, hydroxy and halogen; $R_5$ represents lower alkyl; and $R_6$ lower alkoxy.

References Cited in the file of this patent

Kyburz et al.: Helv. Chim. Acta, volume 43 (1960), pages 2071–82.